(12) United States Patent
Subramanian et al.

(10) Patent No.: US 9,838,454 B2
(45) Date of Patent: Dec. 5, 2017

(54) POLICY-BASED PAYLOAD DELIVERY FOR TRANSPORT PROTOCOLS

(71) Applicant: Cisco Technology, Inc., San Jose, CA (US)

(72) Inventors: Vijaynarayanan Subramanian, San Jose, CA (US); Raghuram S. Sudhaakar, Sunnyvale, CA (US); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 541 days.

(21) Appl. No.: 14/325,776

(22) Filed: Jul. 8, 2014

(65) Prior Publication Data
US 2015/0312311 A1 Oct. 29, 2015

Related U.S. Application Data

(60) Provisional application No. 61/982,976, filed on Apr. 23, 2014.

(51) Int. Cl.
| | | |
|---|---|---|
| *H04L 29/06* | (2006.01) | |
| *H04L 29/08* | (2006.01) | |
| *G06F 17/30* | (2006.01) | |
| *H04L 12/24* | (2006.01) | |

(52) U.S. Cl.
CPC ........ *H04L 65/605* (2013.01); *G06F 17/3051* (2013.01); *H04L 41/0246* (2013.01); *H04L 67/12* (2013.01); *H04L 69/22* (2013.01)

(58) Field of Classification Search
CPC ... H04L 65/605; H04L 41/0246; H04L 67/12; H04L 69/22; G06F 17/3051

USPC .......................................................... 709/223
See application file for complete search history.

(56) References Cited

U.S. PATENT DOCUMENTS

| | | |
|---|---|---|
| 7,027,446 B2 | 4/2006 | Rosenfeld et al. |
| 7,254,632 B2 | 8/2007 | Zeira et al. |
| 7,519,733 B1 | 4/2009 | Thubert et al. |
| 8,010,685 B2 | 8/2011 | Singh et al. |
| 8,228,954 B2 | 7/2012 | Thubert et al. |
| 8,495,072 B1 | 7/2013 | Kapoor et al. |
| 8,724,533 B2 | 5/2014 | Thubert et al. |
| 2005/0020886 A1 | 1/2005 | Hutchinson et al. |

(Continued)

OTHER PUBLICATIONS

Bandyopadhyay et al. "Role of middleware for internet of things: A study", 2011, International Journal of Computer Science and Engineering Survey 2.3, pp. 94-105.*

(Continued)

*Primary Examiner* — Nicholas Taylor
*Assistant Examiner* — Chong G Kim
(74) *Attorney, Agent, or Firm* — Edell, Shapiro & Finnan, LLC

(57) ABSTRACT

Information describing a rule to be applied to a traffic stream is received at an edge network device. The traffic stream is received at the edge network device. A schema is applied to the traffic stream at the edge network device. It is determined that a rule triggering condition has been met. The rule is applied to the traffic stream, at the edge network device, in response to the rule triggering condition having been met. At least one of determining that the rule triggering event has taken place or applying the rule is performed based on the applied schema.

20 Claims, 10 Drawing Sheets

(56) References Cited

U.S. PATENT DOCUMENTS

| | | | |
|---|---|---|---|
| 2006/0230309 A1* | 10/2006 | Kromer | G06F 11/2294 714/11 |
| 2006/0268866 A1 | 11/2006 | Lok | |
| 2007/0121615 A1* | 5/2007 | Weill | H04L 12/4633 370/389 |
| 2007/0189185 A1* | 8/2007 | Chen | H04L 41/0893 370/252 |
| 2008/0250058 A1 | 10/2008 | Zadorozhny | |
| 2009/0217343 A1 | 8/2009 | Bellwood et al. | |
| 2010/0103837 A1 | 4/2010 | Jungck et al. | |
| 2011/0058479 A1* | 3/2011 | Chowdhury | H04L 45/04 370/237 |
| 2011/0173441 A1* | 7/2011 | Bagepalli | H04L 63/166 713/153 |
| 2012/0054136 A1 | 3/2012 | Maulik | |
| 2012/0197852 A1* | 8/2012 | Dutta | H04L 67/2804 707/692 |
| 2012/0197856 A1* | 8/2012 | Banka | H04L 67/2885 707/706 |
| 2012/0197898 A1* | 8/2012 | Pandey | H04L 67/12 707/741 |
| 2012/0197911 A1* | 8/2012 | Banka | G06F 17/30864 707/752 |
| 2012/0327779 A1 | 12/2012 | Gell et al. | |
| 2013/0159451 A1 | 6/2013 | Luciw | |
| 2013/0290305 A1 | 10/2013 | Feng et al. | |
| 2013/0307693 A1 | 11/2013 | Stone et al. | |
| 2014/0036921 A1 | 2/2014 | Hutt et al. | |
| 2015/0254190 A1* | 9/2015 | Yang | H04W 4/005 710/8 |
| 2015/0350809 A1* | 12/2015 | Yang | H04W 74/04 455/418 |
| 2016/0007137 A1* | 1/2016 | Ahn | H04L 12/6418 370/254 |
| 2016/0085594 A1* | 3/2016 | Wang | H04W 4/005 709/226 |
| 2016/0112374 A1* | 4/2016 | Branca | H04L 63/102 726/1 |

OTHER PUBLICATIONS

Datta et al. "Smart M2M gateway based architecture for M2M device and Endpoint management", 2014, Internet of Things (iThings), 2014 IEEE International Conference on, and Green Computing and Communications (GreenCom), IEEE and Cyber, Physical and Social Computing (CPSCom), IEEE. IEEE, pp. 61-68.*
Partial International Search Report in counterpart International Application No. PCT/US2015/026849, dated Jul. 28, 2015, 5 pages.
E. Wes Bethel et al., "Accelerating Network Traffic Analytics Using Query-Driven Visualization", Visual Analytics and Technology, 2006 IEEE Symposium on Visual Analytics Science and Technology, Oct. 31-Nov. 2, 2006 Baltimore, MD, USA, 8 pages.
International Search Report and Written Opinion in counterpart International Application No. PCT/US2015/026847, dated Jul. 29, 2015, 14 pages.
International Search Report and Written Opinion in counterpart International Application No. PCT/US2015/026849, dated Oct. 5, 2015, 21 pages.

* cited by examiner

```
"meta" : {
    "ruleid" : "samplerule",
    "context" : "OpenContext",
    "timer" : "3",
    "cache" : "1024",
},
"network" : {
    "protocol" : "tcp",
    "decode" : "1,2,A,3,4,B",
    "filter-by" : {
        "srcaddr" : "172.27.231.29",
        "sport" : "172.27.230.32",
        "dstaddr" : "4000",
        "dport" : "4082",
    },
},
"application" : {
    "protocol" : "http",
    "filter-by" : {
        "Content-Type" : "application/json",
        "Host" : "sensor-device.com",
    },
},
"content" : {
    "query" : "pressure>23",
},
"action" : {
    "type" : "event",
    "name" : [ "GetHeader", "GetPayload" ],
    "endpoint" : {
        "method" : "http",
        "addr" : "172.27.231.29",
        "port" : "5001",
        "resource" : "/process/sensor.pl",
    },
},
```

META BLOCK 510
NETWORK BLOCK 520
APPLICATION BLOCK 530
CONTENT BLOCK 540
ACTION BLOCK 550

FIG.5

```
PUT /sensordemo.json HTTP/1.1
Host: 128.107.165.80
Authorization: Basic T3BlbkNvbnRleHQ6Zm9vYmFy
Content-Type: application/config
Content-Length: 529

{
    "meta" : {
        "ruleid" : "sensordemo",
        "context" : "OpenContext",
        "timer" : "3",
        "cache" : "1024",
    },
    "network" : {
        "protocol" : "udp",
    },
    "application" : {
        "protocol" : "http",
        "Filter-by" : {
            "Content-Type" : "application/json",
        },
    },
    "action" : {
        "type" : "event",
        "name": [ "GetHeader", "GetPayload" ],
        "endpoint" : {
            "method" : "http",
            "addr" : "172.27.231.28",
            "port" : "5001",
        },
    },
}
```

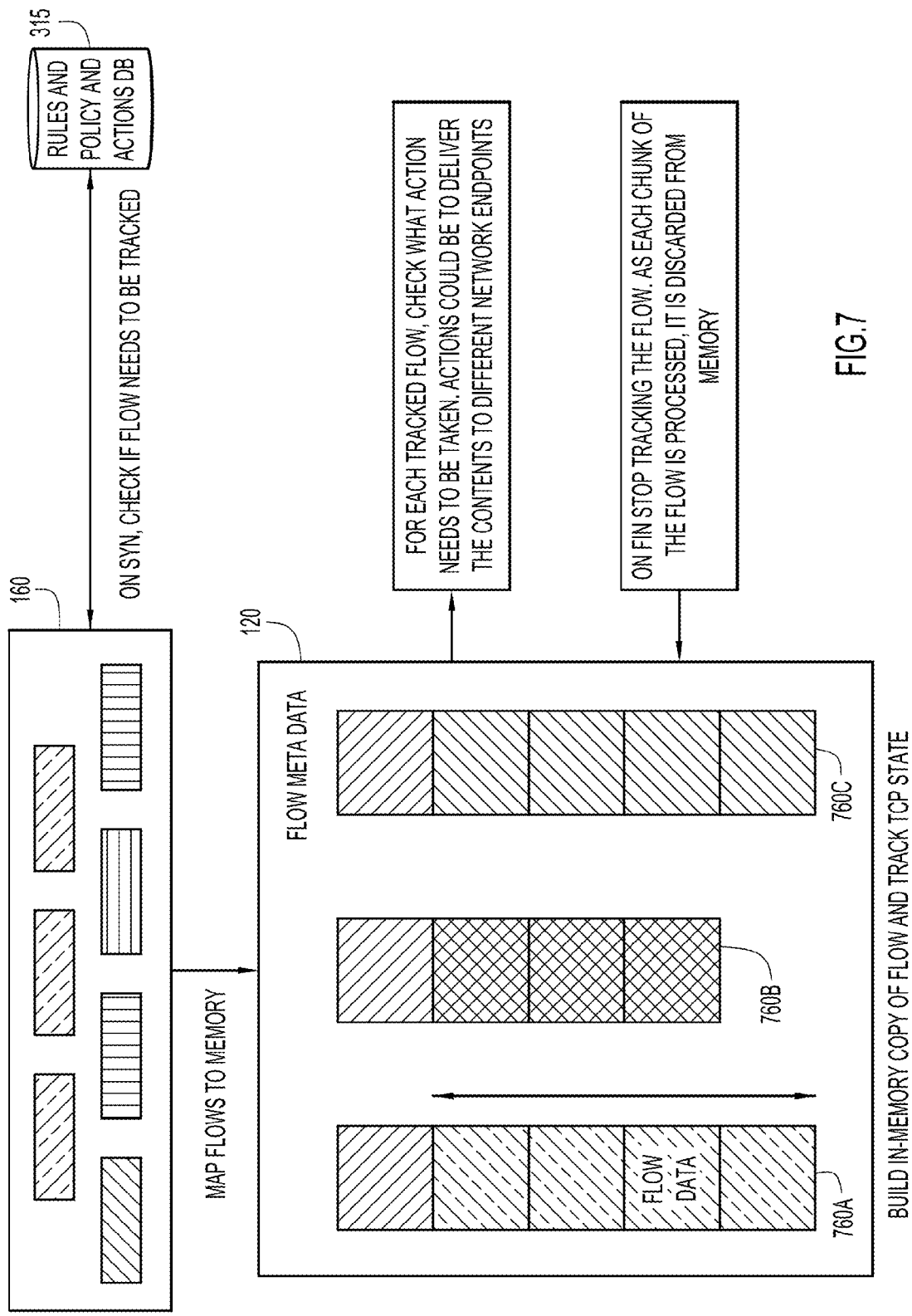

POLICY-BASED PAYLOAD DELIVERY FOR TRANSPORT PROTOCOLS

CLAIM OF PRIORITY TO PROVISIONAL APPLICATION

This application claims priority to U.S. Provisional Application No. 61/982,976, filed Apr. 23, 2014, the entirety of which is incorporated herein by reference.

TECHNICAL FIELD

The present disclosure relates to data acquisition and analysis of data received at edge network devices.

BACKGROUND

In the evolution of the Internet, the term Internet of Things ("IoT") has been coined to refer to the unique identifiable physical objects and their virtual representations interconnected in a vast network environment. These virtual representations may also be referred to as the Internet of Everything ("IoE") within certain contexts, but there are distinctions between the two concepts. IoE is the networked connection of people, process, data and things. In contrast, IoT involves the networked connections of physical objects and data representations and does not include the people and process components. Hence, IoE comprises multiple dimensions of technology transitions, and may include IoT.

Today, more than 99% of things in the physical world are still not connected to the Internet. As sensor devices and nodes are attached to the Internet, they will generate vast amounts of data that will need to be processed. The amount of data generated will dwarf the already huge amount of Internet traffic generated today. From research predictions, more than 30 billion devices will be connected to the Internet by 2020.

The current underlying technical approach for processing IoT and/or IoE data is to "store first, analyze later" where all the data from the IoT and/or IoE is processed in the cloud and backend servers at a later time.

BRIEF DESCRIPTION OF THE DRAWINGS

FIG. 5 illustrates a first example of a specific JSON file, including a first example schema to be applied to traffic streams in order to provide policy-based payload delivery for transport protocols, according to an example embodiment.

FIG. 6 illustrates a second example of a specific JSON file, including a second example schema to be applied to traffic streams in order to provide policy-based payload delivery for transport protocols, according to an example embodiment.

FIG. 7 is illustrates a first example of how rules and the schemas are applied at an edge network device in order to provide policy-based payload delivery for transport protocols, according to an example embodiment.

DESCRIPTION OF EXAMPLE EMBODIMENTS

Overview

In accordance with one embodiment, information describing a rule to be applied to a traffic stream is received at an edge network device. The traffic stream is received at the edge network device. A schema is applied to the traffic stream at the edge network device. It is determined that a rule triggering condition has been met. The rule is applied to the traffic stream, at the edge network device, in response to the rule triggering condition having been met. At least one of determining that the rule triggering event has taken place or applying the rule is performed based on the applied schema.

Example Embodiments

Figure 1:
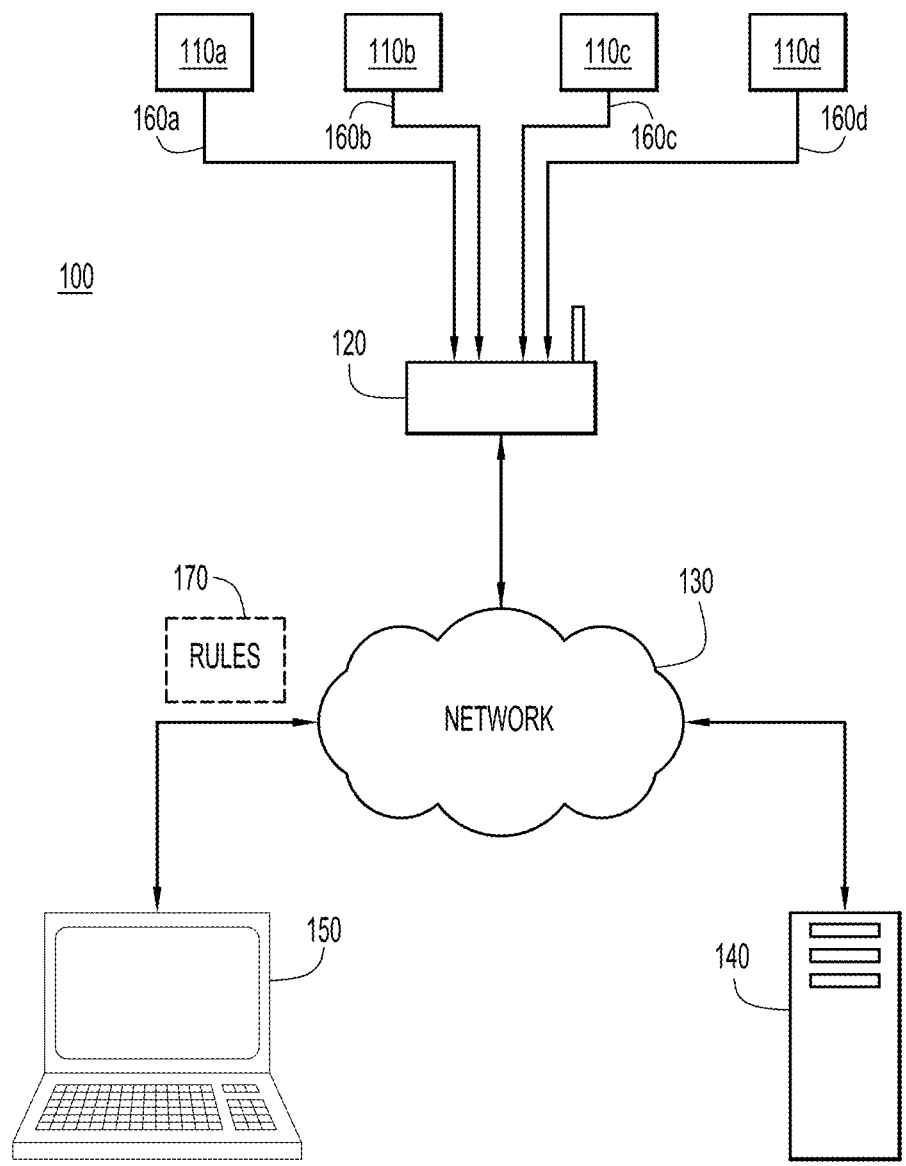
FIG. 1 is a network environment configured to provide policy-based payload delivery for transport protocols, according to an example embodiment.

Depicted in FIG. 1 is a network environment 100 configured to provide policy-based payload delivery for transport protocols. Specifically, the network environment 100 comprises sensors or other data sources 110*a-d*, an edge network device 120, a network 130, a data backend 140, and one or more users 150. Within this architecture, data or traffic streams 160*a-d* are received from the sensors and/or data sources 110*a-d* at the edge network device 120. Accordingly, as used herein, an edge network device may refer to a first-hop network device. Example embodiments of edge network devices include first-hop devices which receive traffic streams directly from IoT or IoE devices. Users 150 provide rules 170 for how the traffic streams 160*a-d* are to be processed by edge network device 120. These rules allow edge network device 120 to provide Policy-based Payload Delivery for Transport Protocols. According to the rules 170 provided by the user 150, the data in the data steams 160*a-d* may be forwarded to the data backend 140 or to the one or more users 150. Rules 170 may also define further actions in accordance with the techniques described herein.

Network environment 100 may be configured to address IoT and/or IoE challenges. For example, from a particular user's perspective, not all data in one or more of traffic streams 160*a-b* may be of interest. Accordingly, the ability to set rules and policies on the edge network device 120 along with capabilities to search the data in real-time and trigger subsequent context-aware actions will provide benefits to users 150. In some IoT and/or IoE scenarios, multiple endpoints or users may need to access different parts of the same traffic stream. By allowing users 150 to establish rules 170, edge network device 120 can be instructed to provide only the portions of traffic streams 160*a-d* indicated in rules

170. In other words, rules 170 may define different actions that may be taken in response to different content with the goal of being able to deliver different parts of the content to different users. Moreover, this delivery of the content can be requested by users at different times via multiple delivery methods through the use of time-sensitive rules or multiple nested rules.

Rules 170 can also provide mechanisms to understand, index and search the content of traffic streams 160a-d. For example, rules 170 can instruct the edge network device 120 to take a variety of different actions in response to traffic streams 160a-d that match conditions in Open System Interconnection (OSI) Model Layer 3 (L3), Layer 4 (L4) and Layer 7 (L7) headers as well as packet content. Rules 170 can also instruct edge network device 120 to apply schemas to traffic streams 160a-d so that the data can be interpreted in specific ways. Such conditions and actions are registered to edge network device 120 via rules 170 which may be generated through a standard Application Programming Interface ("API") by a user 150. For example, a particular rule generated by user 150 through an API may cause edge network device 120 to deliver different parts of the same flow to different endpoint/uniform resource identifier ("URI") after optionally processing it at the edge network device 120. According to other examples, a rule may actuate sensors or trigger other policies if one or more of the traffic streams 160a-d meet the conditions of a policy set by the rule. Additional examples of the functionality that may be embodied in rules 170 include:

1: Applying matching criteria for L3 and L4 headers. In particular, allowing users to match on a specific value or a range of values of IP addresses and ports.
2: Placing conditions on which types of traffic are captured by the edge network device based on the L7 application specific headers. For example, a policy may request capture of a specific type of data file or video traffic of a certain encoding and/or specific resolution.
3: Conditioning the execution of certain actions on the results of user-defined queries which are run against the traffic streams. For example, a rule may impose a condition that says the traffic must be HTTP traffic, the content of the traffic is text and/or html data, and the host of the traffic is "www.serviceprovider.com." In other words, the rule may only apply to html files arriving from serviceprovider.com.
4: Specifying actions to take on the received traffic stream. Actions can include copying and delivering the entire stream, or a part thereof, to a number of specified URI endpoints, optionally preprocessing, encapsulating and/or authenticating the data using parameters specified in the rule.
5: Actions can trigger further rules, actuate other sensors, index the data, archive the data for later retrieval, periodically poll and get samples from sensors, forward the results of the query, forward the entirety of the indexed content, forward a subset of the indexed content, forward only indexed content relevant to the query results, or, if the content itself is indexed data, merge and forward the indexed results as a router function. Traffic streams can also be blocked or dropped based on the content of the received traffic streams.

In other words, the techniques described herein provide the ability to parse, index, semantically understand and search not only L3, L4 and L7 headers but also the content payload of traffic streams. These capabilities make it possible for policy-based processing of IoT and/or IoE streams whereby a rich set of actions may be carried out on matching flows, including delivery of payload content to multiple endpoints.

Figure 2:
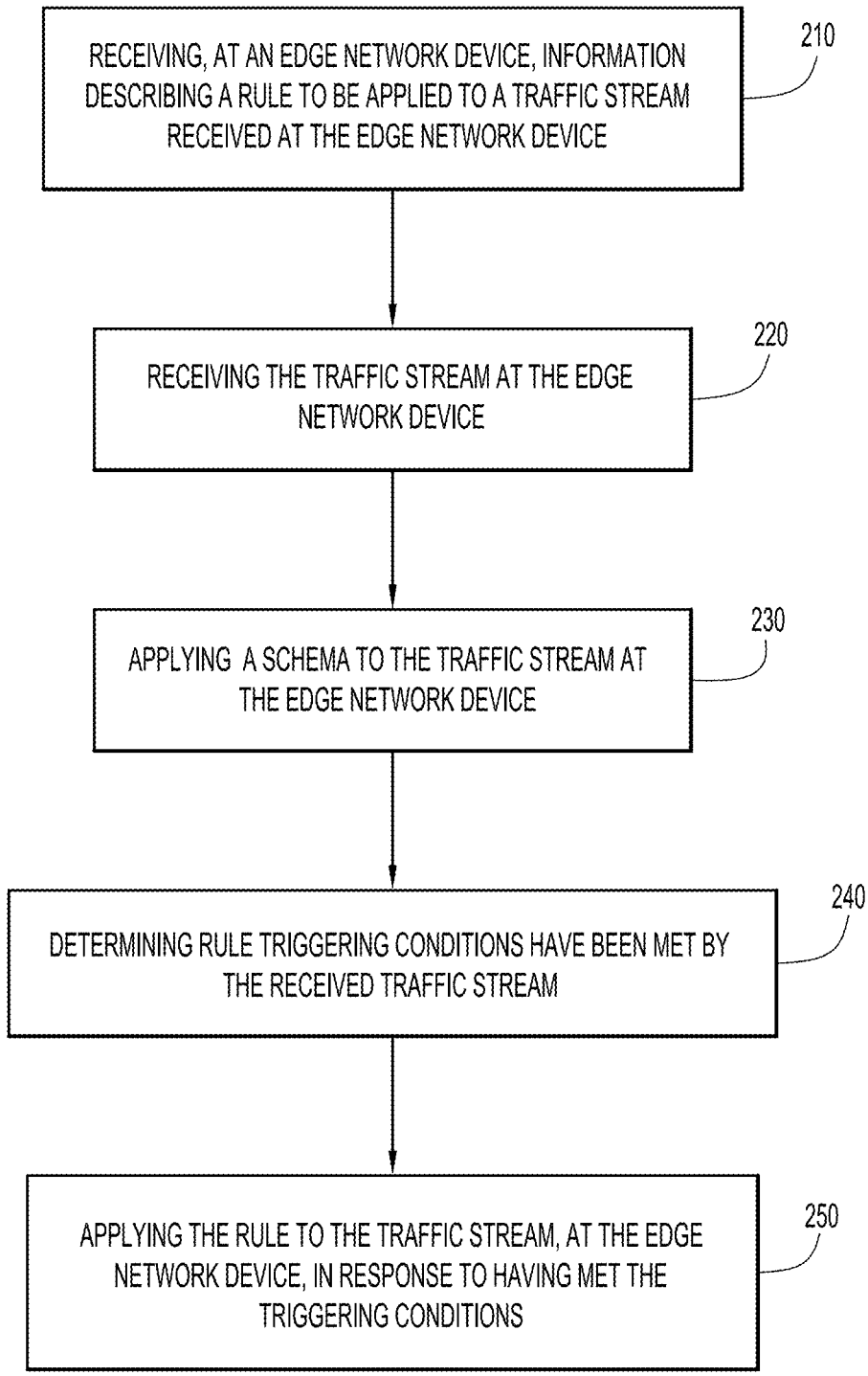
FIG. 2 is a flowchart illustrating a method for providing policy-based payload delivery for transport protocols, according to an example embodiment.

Depicted in FIG. 2 is a flow chart 200 illustrating a method of providing policy based payload delivery for transport protocols. The method begins in 210 where information describing a rule to be applied to a traffic stream is received at an edge network device. The information describing the rule may take the form of one or more rules 170 from FIG. 1, and may be sent as a Representational State Transfer (REST) message generated by an API. According to other examples, the rules may be pre-defined during, for example, the configuration of the edge network device. Therefore, receiving information describing a rule may be interpreted to encompass receipt of a user defined rule, or the reading of a pre-defined rule previously received and stored in the edge network device. In 220, a traffic stream is received at the edge network device. In 230, a schema is applied to the traffic at the edge network device. The application of the schema may comprise indexing the content of the traffic stream. The application of the schema may also comprise interpreting the data of the traffic stream according to a schema for a particular type of data. For example, applying the schema may include interpreting the data according to a data format such as a comma separated values (CSV) data file, a text (TXT) data file, a hyper text mark-up language (HTML) data file, a extensible mark-up language (XML) data file, a JavaScript Object Notation (JSON) file, and others. The application of the schema may take place in response to instructions included in the rule. A determination is made that a rule triggering condition has been met at 240. The determination may include the execution of a query against the data to which the schema has been applied, and therefore, the determination that the rule triggering event has taken place is based on the applied schema. According to such an example, the query may be included as part of the rule. For example, the query may be run to determine if a precondition defined by the rule has been met. According to other examples, the query may be used to look for a portion of the traffic stream to which the rule will be applied. The determination of the rule-triggering condition is not limited to the execution of queries. For example, the event triggering condition may be based on having received a certain volume of data, and/or may be based upon time, such as how much time has passed since the traffic stream was first received.

In 250, the rule is applied at the edge network device in response to determining the rule triggering condition has been met. While specific examples of the application of rules will be described in greater detail with reference to FIGS. 5-9, it is noted that the application of the rule may be in response to the applied schema. For example, the rule may require that only a subset of decoded data be forwarded to a specific endpoint.

The process of FIG. 2 can be viewed as a process which takes the form of Condition(s)-Action(s) configuration in which actions are taken when certain conditions are met. For example, a Conditions(s)-Action(s) configuration may take the form of:

IF Protocol Parameters AND Content Parameters THEN Actions

In other words, if some or all of a traffic stream meets protocol parameters and content parameters, then certain actions are taken. Accordingly, the rule received in 210 of FIG. 2 may define parameters and actions. The determination in 240 is whether the parameters are met, and applying the rule in 250 may be the performance of the rule-defined actions.

Thus, to summarize, FIG. 2 depicts a method comprising: receiving, at an edge network device, information describing a rule to be applied to a traffic stream received at the edge network device; receiving the traffic stream at the edge network device; applying a schema to the received traffic stream at the edge network device; determining that a rule triggering condition has been met by the received traffic stream; and applying the rule to the traffic stream, at the edge network device, in response to having met the rule triggering condition. Furthermore, either the determination of the rule triggering condition or the application of the rule is performed place based on the applied schema.

The rule and query may be sent to the edge network device in the form of a dynamic data definition ("D3") which references protocol parameters, content parameters, and subsequent actions to take. In this approach, protocol and protocol parameters may refer to one or a combination of network protocol, transport protocol and application protocol parameters. Content and content parameters refer to the payload, i.e., the data that is not part of any protocol header.

A protocol parameter may include one or both of application and/or network parameters. The content parameter may refer to the application payload. In another case, if the protocol parameter refers to only transport protocol parameters (e.g. destination port), the content parameter may refer to the transport payload. For example, if a D3 to be applied to a traffic stream contains both application and network protocol parameters, the content parameter(s) may refer to the application payload. In another example, if the D3 contains only transport protocol parameters (e.g. destination port), the content parameters may refer to the transport payload (e.g. Transmission Control Protocol ("TCP") or User Datagram Protocol ("UDP") payload). In order to meet the conditions, the protocol, network and application parameters may be searched or queried to determine if they meet a particular pattern.

An action may take the form of a data management transaction relevant to the underlying data, or one or more action calls. Actions may also take the form of event-driven actions and timer-driven actions. An event-driven action is an operation that is executed in the event of pattern matches against the data. Timer-driven actions may be scheduled actions that are periodically executed based on a timer.

Figure 3:
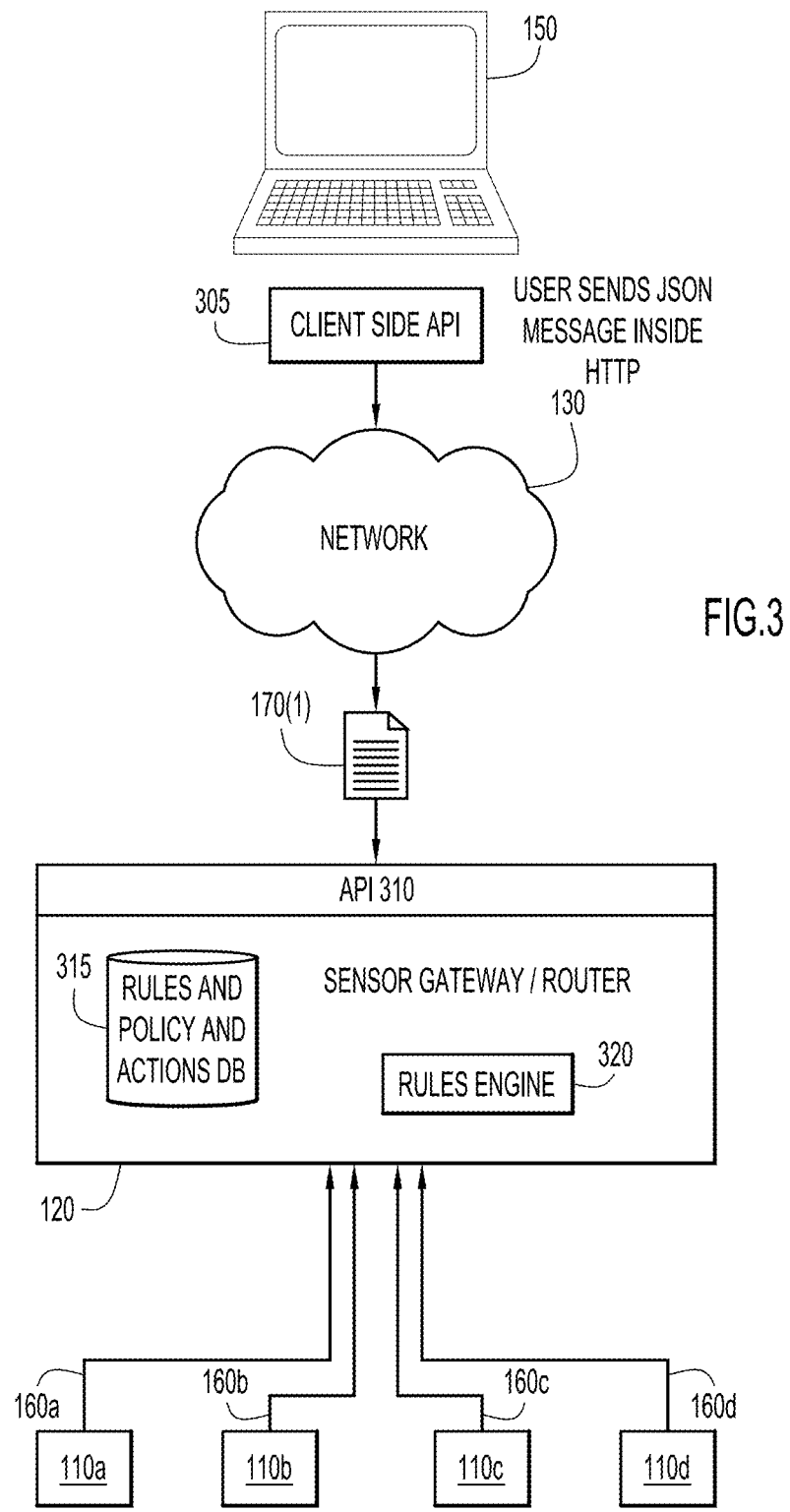
FIG. 3 is a block diagram of how a rule, query and action, are sent to the edge network device from a user, according to an example embodiment.

Depicted in FIG. 3 is a more detailed example of how a rule 170(1) (which may also include a query and action in the form of a D3), is generated by a user 150, sent to the edge network device 120, and applied at the edge network device 120. A user 150 may enter the elements of a rule 170(1) or D3 through a client side API 305. Client side API 305 may be embodied in an application running on a user's workstation. The application may include a graphical user interface ("GUI") and tools facilitating the creation of a desired rule. The client side API 305 may then convert the rule to a format suitable for transmission through network 130 and for processing by edge network device 120. For example, the GUI of client side API 305 may allow a user to graphically construct a query which will subsequently be converted by client side API 305 to the appropriate query language for execution at edge network device 120 and/or converted into a JSON file format for transmission and processing at edge network device 120. The rule 170(1) or D3 is sent through the network 130 to the edge network device 120 where it is received at an API 310 located at the edge network device 120. The rule 170(1) or D3 is stored in a rules and policy database 315 at the edge network device 120, and is applied to traffic streams 160a-d through a rules engine 320 located at the edge network device 120.

The rule 170(1) or D3 sent from the user specifies:
1: Meta data about rule;
2: Filters on OSI Model Layer 3, Layer 4 and Layer 7 headers;
3: A query on the payload and/or content of traffic streams 160a-d; and/or
4: A list of actions to take on the payload.

The client side API 305 may be a Representational State Transfer (RESTful) API for a programmer to specify and describe the data of interest. The edge device 120 may also have the capability to understand the semantics of the content and/or payload of the sensor data. The client side API 305 in this case can also be used to write queries describing the semantic content, which if matched against content can result in further actions. In essence, a user 150 writes a program that specifies what data is of interest. The API 305 helps the user translate the rules into a format that can be read by the edge network device 120, such as a standard and open JSON format encapsulated as a REST message that can be understood by an API 310 at the edge network device 120.

The API 310 at the edge network device 120 will receive the REST messages containing the JSON payloads that express the rules, and will register them in rules and policy database 315. A component of API 310 translates the rules from JSON format to the internal format of the edge network device 120. The API 310 will be responsible for translating the JSON messages into internal representations that can be understood by the edge network device 120.

Traffic streams 160a-d that flow through edge network device 120 are searched against the rules in database 315. Edge network device 120 may have the ability to translate, decompress, decode and otherwise manipulate the payload of traffic streams 160a-d in order to index and search the payload and content of the data. Edge network device 120 may also execute ad hoc queries on the payload. Accordingly, traffic streams 160a-d may be searched in real-time using the edge network device API 310 to discover information indicated in the D3 of rule 170(1) from the raw data received in traffic streams 160a-d. The rules in policy database 315 may also specify what should be done with the matching traffic.

Figure 4:
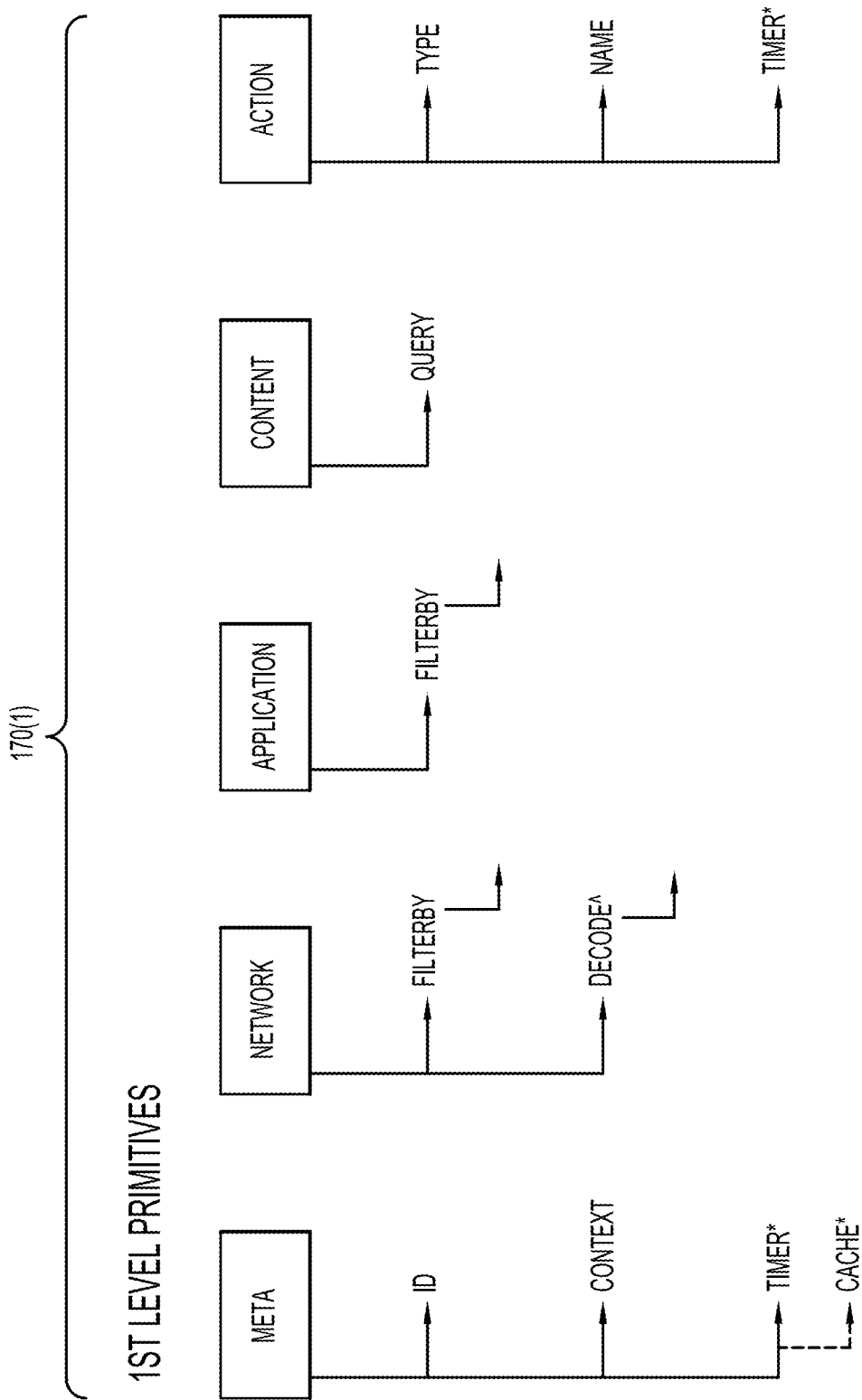
FIG. 4 illustrates the components, particularly the first level primitives of a JavaScript Object Notation (JSON) file which defines a schema to be applied to traffic streams in order to provide policy-based payload delivery for transport protocols, according to an example embodiment.

With reference now made to FIG. 4, illustrated therein are the components, particularly the first level primitives, of a rule 170(1), and more specifically, a JSON D3 file. The JSON message of rule 170(1) contains the following top-level blocks:

The Meta primitive: This block describes the meta-data about the D3.
The Network primitive: This block describes the network parameters.
The Application primitive: This describes the application level fields of interest.
The Content primitive: This describes what queries are to be run on the content/payload.
The Action primitive describes what actions are to be run and what triggers the running
of the action.

Depicted in FIG. 5 is a more specific example of rule 170(1) embodied in a JSON message. The first portion of the JSON file of rule 170(1) is the meta block 510 which contains the following fields:
A. "ruleid": This is the name of the D3 and serves as a reference for the specific rule included in the JSON file.

B. "context": This specifies the context under which the D3 is to be run.

C. "timer": This specifies how frequently the data that has been acquired via a traffic stream should be processed. This may be specified in milliseconds.

D. "cache": Similar to the "meta.timer" field, this specifies how frequently (in terms of bytes seen) the data acquired via a traffic stream should be processed.

The network block 520 describes the network parameters of interest and specifies which data is to be processed. This block contains the following fields:

a. "protocol": This field specifies the transport protocol of interest, e.g. UDP/TCP.

b. "decode": If a payload is encapsulated in TCP or UDP transport without an L7 application header, the decode format string can be used to specify how the payload should be decoded. This allows the user to specify the data model of the payload and to write queries on such payloads. The "decode" field is typically used in situations where the data generator (e.g. sensor) sends a packet with a binary payload that needs to be interpreted as integers, characters or other data types.

c. "Filter-by": This block specifies the set of 4-tuples (source IP, source port, destination IP, destination port) the user is interested in. This block contains the following fields in the specified formats:

i. "srcaddr": This field specifies a range of source IP addresses of interest.

ii. "srcport": This field specifies the set of source port number ranges of interest, and may include a list of comma-separated values. e.g. "[3212,1214,2118-2144]."

iii. "dstaddr": This field is similar to that of "srcaddr," but identifies destination addresses of interest.

iv. "dstport": This field is similar to that of "srcport," but identifies destination ports of interest.

The application block 530 specifies which application-level protocol fields to filter by, and includes the following:

a. "protocol": This field specifies the application or L7 protocol to be filtered or queried, e.g. HTTP, SMTP etc.

b. "Filter-by": This field matches directly on name-value pairs in the L7 header, where the name is supplied by the user. For example, a user may want to match on the "Content-Type" of an XML file received from a specific HOST sent according to the HTTP protocol. Accordingly, the application block may take the form of:

```
"application" :
{
    "protocol" : "http",
    "Filter-by" :
    {
        "Content-Type:" : "application/xml",
        "Host:"         : "sensor-device.com",
    },
}
```

The content block 540 specifies what queries are to be run on the content/payload.

"query": This specifies a query condition to be run against the data in the traffic stream.

In other words, a query condition is a condition set against the specific fields that are found in the payload of the traffic stream. According to the example in content block 540, the query condition looks for payloads with a pressure value greater than a threshold of 23, and takes the form of:

"query": "pressure>23"

Accordingly, the action which will be described below in reference to action block 550 will take place when the "pressure" value in the payload of the traffic stream is greater than 23.

Furthermore, because the payload fields are present in real-time in the traffic stream, determining the underlying schema of the data in the traffic stream can be done in real-time, and need not be predetermined. For example, an edge network device may be equipped with specific drivers which are used to parse the data and, if present, extract an underlying schema. For example, schemas determined in this way may include CSV, XML, JSON, TXT, and HTML schemas. Accordingly, the drivers located at the edge network device may parse the data of the stream in real-time to determine if the data is, for example, CSV, XML, JSON, TXT, HTML, or another type of data. Once the schema for the data of a traffic stream is determined, conditions and queries can be generated which are directed to specific aspects of the data's schema. Said differently, the content of a received traffic stream may be analyzed according to a predetermined schema for the traffic stream. Schema specific attributes of the content may be analyzed in order to apply rules to the traffic stream. This analysis may take the form of executing a query against the content. In response to the analyzing of the schema specific attributes of the content, a rule may be applied to the traffic stream.

Using a Comma Separated Values (CSV) schema as an example, once it is determined that the traffic stream includes CSV data, the edge network device can determine conditions specific to CSV data. Specifically, the edge network device may assign the letter A for the first column, B for the second column, and so forth, for the columns of the CSV data. Once this schema is applied to the data, queries and conditions, such as "A=value" and or "B=value" can be executed against the traffic stream.

The XML schema may include structured and unstructured data. The structured data is represented in the attributes field in the XML tag. The unstructured data are found between "begin" and "end" tags. Accordingly, once the XML schema is applied to the data of the traffic stream, queries and conditions can be executed against both the overall structure of the XML data and the unstructured data.

HTML and TXT formats generate free-text or unstructured data. Each extracted word from HTML and free text formats may be used as a valid keyword against which queries and conditions can be executed. Accordingly, the parser for HTML will attempt to discard HTML tags. According to other examples, queries and conditions may be executed that are based on the content of specific tags, and therefore, the HTML tags may be retained.

The JSON format has an inherently dynamic schema. Specifically, nomenclature for JSON objects follows a typical object model such as in "obj1·obj2·obj3=value." Accordingly, if the data of the traffic stream comprises JSON object formatted data, query and condition statements may be written that utilize this format. For example, data in a JSON traffic stream may take the following format:

```
{
    "Sensor":"GPS",
    "Timestamp":1326369894582,
    "State":
    {
        "Longitude":71.30362551,
        "Altidude":25.5,
```

```
            "Latitude":42.66195771
        }
    }
```

A query or condition statement may take the form of "Sensor=GPS" or "state. Altitude=25.5."

Referring back to FIG. 5, the action block 550 defines which actions are to be taken in response to the filters and policies set earlier in the rule 170(1). In the example of FIG. 5, "type" specifies the type of the action. For example, the "type" of the action may take the form of an event-driven action or a timer-driven action.

Other attributes of action block 550 may include:
  a. "period": This field may be specified for timer-driven actions and ignored for event-driven actions. It specifies the frequency of operation for timer-driven actions.
  b. "endpoint": This field describes the endpoint URI for where the results of the actions are to be sent back.
  c. "method": This field specifies the protocol to be used. If "http" is specified, the results will be encapsulated in an HTTP header with meta-data about the results. If left empty, the results may be sent in a TCP payload.
  d. "addr": This field identifies the IP address of the destination endpoint.
  e. "port": This field identifies the port number for the destination endpoint.
  f. "resource": This field identifies the resource on the destination endpoint which will process the results.

Event driven actions are executed in response to filters or patterns specified in the D3 queries or conditions. For example, a D3 may specify that when JSON traffic is seen encapsulated in HTTP, then the original Header and the Original Payload should be processed. Multiple event-driven actions can be chained together. Examples of event-drive actions are:
  GetHeader: Send original HTTP header back.
  GetPayload: Send original HTTP payload back.
  Syslog: Send back logging information.
  GpsUpdate: Send back GPS location information upon trigger.

Timer-driven actions may be built-in actions that are not triggered by matches on queries, but are carried out at predetermined intervals. The interval may be specified by the "action.period" field of the action block 550. For example, a user may want to specify that every 1000 milliseconds (1 second), the edge network device should fetch data from sensors (i.e. run the action FETCHDATA periodically). Actions such as GPSUPDATE and SYSLOG can be triggered by both timer and event conditions. FETCHDATA and GPSUPDATE are example timer actions. These are described in more detail below.

FETCHDATA performs an HTTP GET on the endpoint. The typical usage is to have a FETCHDATA rule to periodically pull data from sensors and another rule that will actually process the data. DM will automatically pick up the response to the HTTP GET command. It is not mandatory to have a pair rule always but this is the expected usage.

GPSUPDATE is an example of a timer action where the edge network device does not process the resulting traffic. In this case, edge network device periodically sends GPS info to a server using HTTP PUT.

With reference made to FIG. 6, illustrated therein is another JSON formatted rule 170(2) which performs basic authorization using a 64 bit encoding of a username, and performs an action which delivers content to a device with the address "172.27.231.28" on port "5001" using the "http" protocol.

With reference now made to FIGS. 7-10, depicted therein are processes by which a D3, such as those depicted in FIGS. 4-6 are applied at an edge network device. As illustrated in FIG. 7, upon receipt of a SYN message for a traffic stream 160, the traffic streams are compared with the rules/policy database 315 (which has been populated from D3s) to see if they should be tracked. The flows which are to be tracked, in this case, flow 760*a*, flow 760*b* and flow 760*c*, are stored in memory at the edge network device 120. Generally, the rules/policy database 315 is checked to determine which actions need to be taken. Actions could be to deliver the content to different network endpoints. Upon receipt of a FIN message, tracking of the flow 160 is stopped. As portions of the flows are processed, the portions may be discarded from memory.

Figure 8:
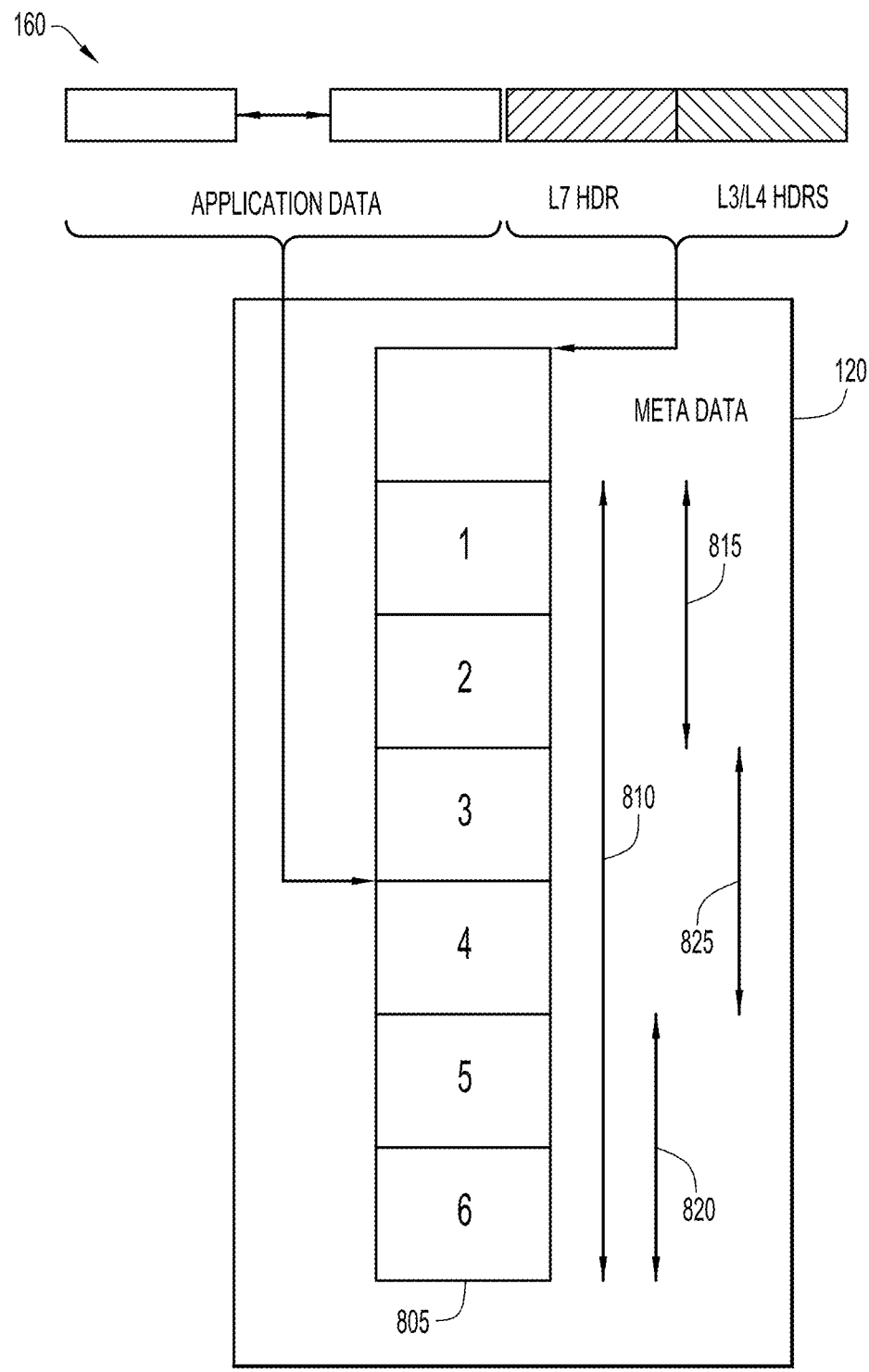
FIG. 8 is a second example of how rules and the schemas are applied at an edge network device in order to provide policy-based payload delivery for transport protocols, according to an example embodiment.

With reference made to FIG. 8, depicted therein is an example where different actions are taken for different portions of the payload of flow 160. As in FIG. 7, if the flow 160 matches a rule in the policy database 315 (not shown in FIG. 8), it is tracked in memory at the edge device 120 as tracked content 805. Different parts of the tracked content may have to be processed differently. For example, some rules may require that the entire payload 810 be sent to a particular endpoint. Another rule may require that first portion 815 and second portion 820 are sent to different endpoints. In other words, one endpoint may receive the entire traffic stream, while another endpoint would only receive, for example, jpeg data included within the same traffic stream. Some portions of the payload may serve as triggers for other rules to be applied. For example, portion 825 may include data indicating that an error has occurred, or a particular event is likely to take place later in traffic stream 160. Accordingly, in response to portion 825, subsequent portions 820 may be processed in different ways.

Figure 9:
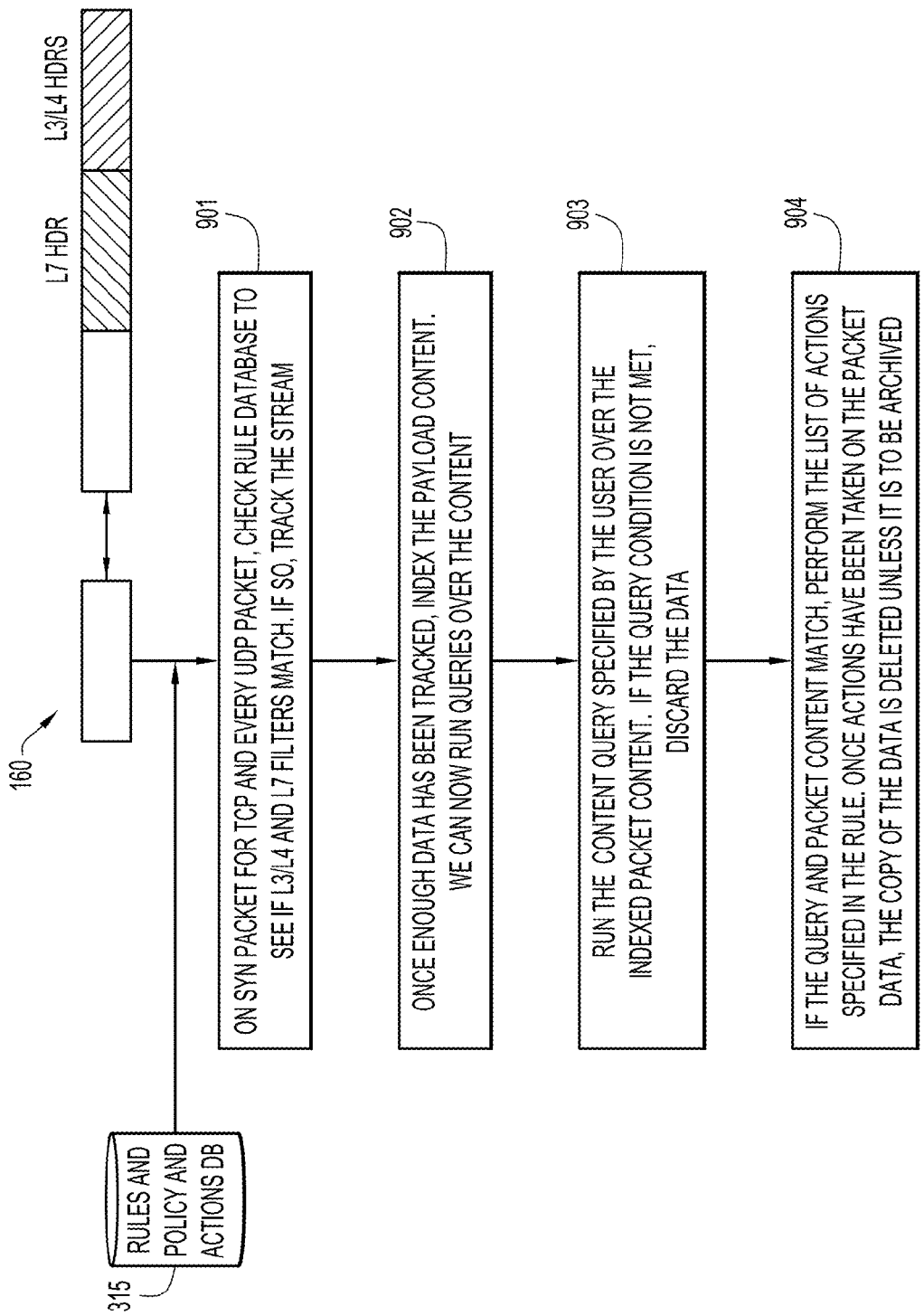
FIG. 9 is a block diagram illustrating event-driven processing providing policy-based payload delivery for transport protocols, according to an example embodiment.

With reference now made to FIG. 9, depicted therein is a block diagram illustrating event-driven processing. At 901, upon receipt of a SYN packet, the rules and policies database 315 is checked to see if the traffic stream 160 data matches any of the rules. For example, L3/L4 and L7 headers may be examined to see if the header content matches any of the filters or rules in database 315. If there is a match, traffic stream 160 is tracked. At 902, the payload content of matching data is indexed. The indexing may not take place until a threshold amount of matching data is received over the traffic stream 160. In 903, content queries are run over the indexed packet content. If the query is not met, the content may be discarded. If the query is met, in 904 the list of actions specified by the rule are carried out on the packet data. Once the actions are carried out, the data may be discarded, maintained and/or archived.

Figure 10:
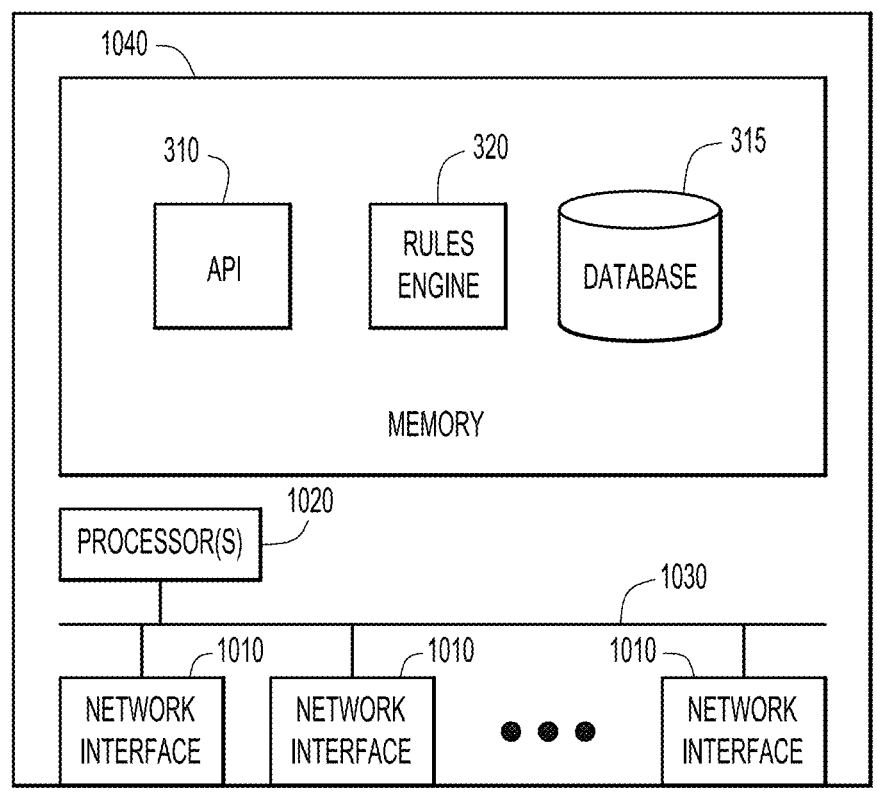
FIG. 10 is a block diagram illustrating a device configured to perform policy-based payload delivery for transport protocols, according to an example embodiment.

Referring now to FIG. 10, an example block diagram is shown of an edge network device 120 configured to perform the techniques described herein. Edge network device 120 comprises network interfaces 1010 which may be used to connect to IoT and/or IoE devices, such as sensors, or to backend and end user systems through a network. A processor 1020 is provided to coordinate all controls and functions of edge network device 120. The processor 1020 is, for example, a microprocessor or microcontroller, and it communicates with the network interface 1010 via bus 1030. Memory 1040 comprises software instructions which may be executed by the processor 1020. For example, software instructions for edge network device 120 includes instructions for edge network device API 310 and or rules engine 320, as described above. Policy database 315 may also be stored in memory 1040. In other words, memory 1040 includes instructions that enable edge network device 120 to carry out the operations described above in connection with FIGS. 1-9.

Memory 1040 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 1040 may comprise one or more tangible (non-transitory) computer readable storage media (e.g., a memory device) encoded with software comprising computer executable instructions. When the software, e.g., process logic for API 310 and rules engine 320, is executed (by the processor 1020), the processor is operable to perform the operations described herein in connection with FIGS. 1-9.

Thus, in one form, an apparatus is provided comprising a network interface unit to enable communication over a network on behalf of an edge network device: and a processor coupled to the network interface unit, to: receive, via the network interface unit, information describing a rule to be applied to a traffic stream; receive the traffic stream via the network interface unit; apply a schema to the received traffic stream; determine that a rule triggering condition has been met by the received traffic stream; and apply the rule to the traffic stream in response to having met the rule triggering condition; wherein based on the applied schema, the processor determines that the rule triggering condition has been met or applies the rule to the traffic stream.

Similarly, one or more computer readable storage media are provided encoded with software comprising computer executable instructions and when the software is executed operable to: receive, at an edge network device, information describing a rule to be applied to a traffic stream; receive the traffic stream at the edge network device; apply a schema to the received traffic stream; determine that a rule triggering condition has been met by the received traffic stream; and apply the rule to the traffic stream, at the edge network device, in response to having met the rule triggering condition; wherein at least one of the instructions operable to determine that the rule triggering condition has been met or the instructions operable to apply the rule to the traffic stream are based on the applied schema.

The above description is intended by way of example only. Various modifications and structural changes may be made therein without departing from the scope of the concepts described herein and within the scope and range of equivalents of the claims.

What is claimed is:

1. A method comprising:
   receiving, at an edge network device, information describing a rule to be applied to a traffic stream received at the edge network device;
   receiving the traffic stream at the edge network device;
   applying a schema to the received traffic stream, wherein applying the schema to the received traffic stream comprises decoding content of binary values of the received traffic stream, and indexing the decoded content at the edge network device;
   determining that a rule triggering condition has been met by the received traffic stream, wherein determining that the rule triggering condition has been met comprises executing a query against the decoded content; and
   applying the rule to the traffic stream, at the edge network device, in response to having met the rule triggering condition,
   wherein at least one of determining that the rule triggering condition has been met or applying the rule to the traffic stream is performed based on the applied schema.

2. The method of claim 1, wherein receiving the information describing the rule further comprises receiving the query.

3. The method of claim 1, wherein executing the query comprises executing a query in real-time, and
   wherein applying the rule comprises forwarding a subset of the received traffic stream.

4. The method of claim 1, wherein applying the schema to the received traffic stream comprises indexing Layer 7 payload content of the traffic stream.

5. The method of claim 1, wherein applying the schema to the received traffic stream comprises indexing at least one of Layer 3 header content, Layer 4 header content or Layer 7 header content.

6. The method of claim 1, wherein applying the schema to the received traffic stream comprises applying the schema to the received traffic stream as it is received at the edge network device.

7. The method of claim 1, wherein receiving the information describing the rule comprises receiving information describing a window of the traffic stream within which at least one of applying the schema or applying the rule will be performed.

8. The method of claim 7, wherein receiving the information describing the window comprises receiving information describing a time window.

9. The method of claim 7, wherein receiving the information describing the window comprises receiving information describing a data size window.

10. The method of claim 1, wherein receiving the traffic stream comprises receiving a plurality of traffic streams from a plurality of Internet of Things (IoT) devices.

11. The method of claim 1, wherein applying the rule comprises forwarding indexed content.

12. The method of claim 1, wherein receiving the traffic stream at the edge network device comprises receiving previously indexed content, and wherein applying the rule to the traffic stream comprises merging the previously indexed content with the decoded content indexed at the edge network device and forwarding the combined results.

13. An apparatus comprising:
   a network interface unit to enable communication over a network on behalf of an edge network device; and
   a processor coupled to the network interface unit, to:
      receive, via the network interface unit, information describing a rule to be applied to a traffic stream;
      receive the traffic stream via the network interface unit;
      apply a schema to the received traffic stream by decoding content of binary values of the received traffic stream and indexing the decoded content;
      determine that a rule triggering condition has been met by the received traffic stream by executing a query against the decoded content; and
      apply the rule to the traffic stream in response to having met the rule triggering condition,
      wherein based on the applied schema, the processor determines that the rule triggering condition has been met or applies the rule to the traffic stream.

14. One or more tangible, non-transitory computer readable storage media encoded with software comprising computer executable instructions and when the software is executed operable to:
   receive, at an edge network device, information describing a rule to be applied to a traffic stream;

receive the traffic stream at the edge network device;

apply a schema to the received traffic stream by decoding content of binary values of the received traffic stream and indexing the decoded content at the edge network device;

determine that a rule triggering condition has been met by the received traffic stream by executing a query against the decoded content; and apply the rule to the traffic stream, at the edge network device, in response to having met the rule triggering condition, wherein at least one of the instructions operable to determine that the rule triggering condition has been met or the instructions operable to apply the rule to the traffic stream are based on the applied schema.

15. The apparatus of claim 13, wherein the processor is further configured to:

execute the query against the decoded content in real-time; and apply the rule by forwarding a subset of the received traffic stream.

16. The apparatus of claim 13, wherein the processor is further configured to apply the schema to the received traffic stream by indexing Layer 7 payload content of the traffic stream.

17. The apparatus of claim 13, wherein the processor is further configured to apply the schema to the received traffic stream by indexing at least one of Layer 3 header content, Layer 4 header content or Layer 7 header content.

18. The tangible, non-transitory computer readable storage media of claim 14, wherein the instructions operable to execute the query against the decoded content are operable to:

execute the query against the decoded content in real-time; and apply the rule to forward a subset of the received traffic stream.

19. The tangible, non-transitory computer readable storage media of claim 14, wherein the instructions operable to apply the schema to the received traffic stream are operable to index Layer 7 payload content of the traffic stream.

20. The tangible, non-transitory computer readable storage media of claim 14, wherein the instructions operable to apply the schema to the received traffic stream are operable to index at least one of Layer 3 header content, Layer 4 header content or Layer 7 header content.

* * * * *